June 28, 1932. C. J. W. SODERBERG 1,864,868
AUTOMOBILE WIND WING
Filed Jan. 2, 1930  3 Sheets-Sheet 3
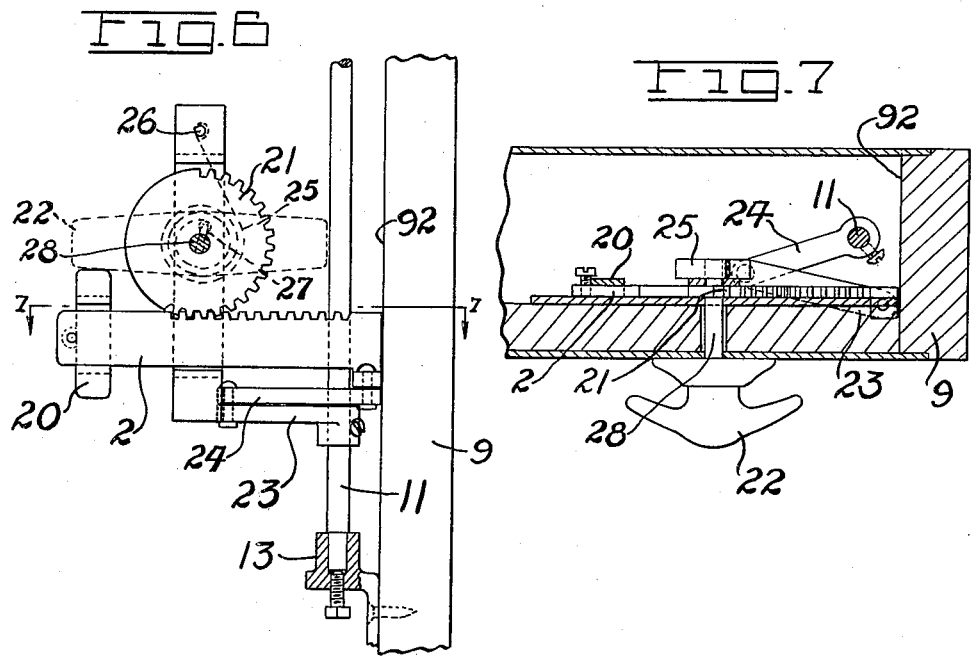
Inventor
Casper J.W. Soderberg
By Reynolds+Reynolds
Attorneys Patented June 28, 1932

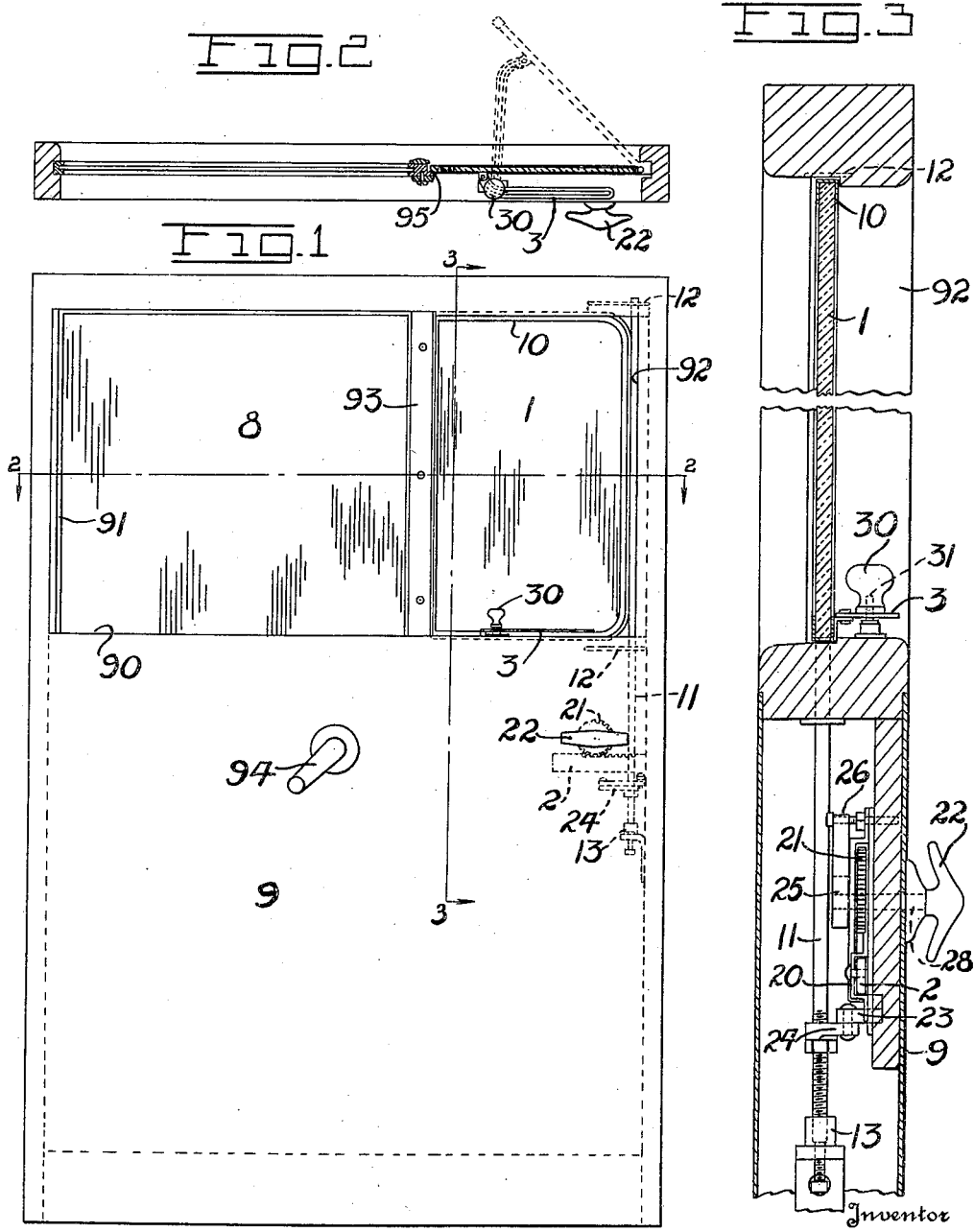

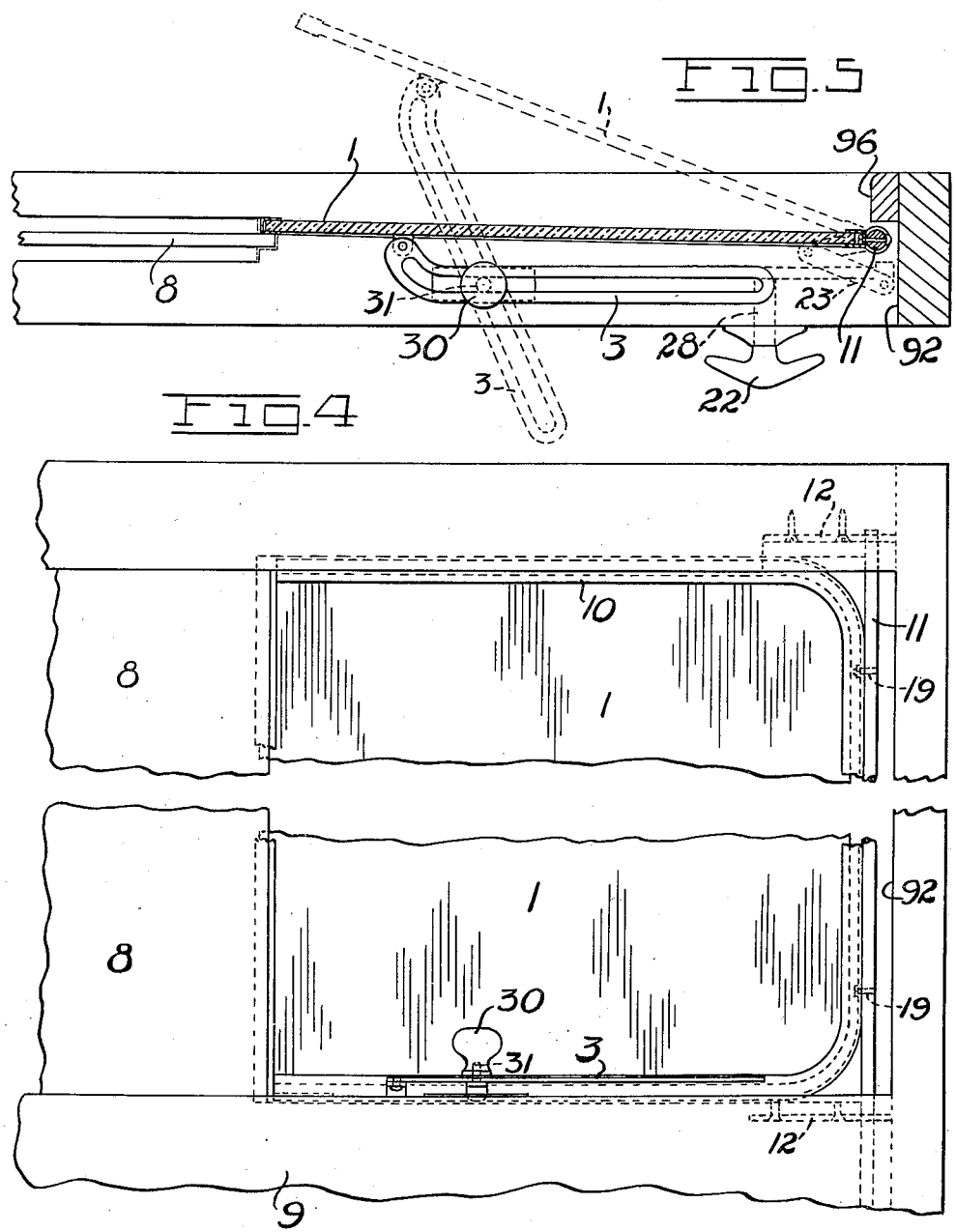

1,864,868

UNITED STATES PATENT OFFICE

CASPER J. W. SODERBERG, OF ABERDEEN, WASHINGTON

AUTOMOBILE WIND WING

Application filed January 2, 1930. Serial No. 418,014.

My invention relates generally to windows, but more particularly to windows of motor vehicles.

The desirability of wind wings to guard against the admission of drafts to the interior of an automobile, while yet permitting the window to be left partly or wholly open is increasingly recognized, but these wings may be a source of danger, in that, when they collect rain drops or dust, and especially in the glare of approaching cars at night, it is extremely difficult to see through them. For such reasons it is not desirable that they be left projecting permanently, but they should be so mounted that they can be drawn in. However, the means for controlling such wind wings are of necessity wholly without the car, and not operable from within the car, except, of course, by thrusting the hand through the window opening, for which purpose the window must be largely, if not wholly, open.

It is frequently desirable to keep the window largely closed, yet to permit some opening for purposes of ventilation, but with the ordinary automobile window it can be opened only from the top, and in consequence of its extreme width, even when wind wings are employed, eddies will blow in through the partly opened window, with certain discomfort to the driver and to those in the rear of the car, and with possible ill effects on their health.

The objects of my invention, then, are to provide a wind wing which is built into the car as an integral part thereof, and which is operable from within the car without the necessity of opening the window, and, to provide a wind wing by means of which a sufficient amount of opening may be left for ventilation, guarded by the wind wing against the entry of drafts, and permitting the window opening, especially the rear part thereof, to be otherwise closed to prevent the entry of undesired drafts.

Another object of my invention is to provide a wind wing which, in effect, is a part of the ordinary window, but which is provided with means urging it inwardly to the end that upon release of a holding member it will automatically move inwardly into closed position, or may be stopped and held at any adjusted position within its limits of movement.

Other objects, and particularly such as refer more directly to the mechanical features of my invention, will be best ascertained from a study of the drawings, of this specification, and of the claim.

My invention comprises the novel parts, and the novel combination and arrangement thereof, as shown in the accompanying drawings, described in the specification, and as particularly defined by the claim which terminates the same.

In the accompanying drawings, I have shown my invention in a form which is now preferred by me.

Figure 1 is an inside elevation of a door, showing my invention incorporated therein.

Figure 2 is a section through such a door, on the line 2—2 of Figure 1.

Figure 3 is a vertical section on an enlarged scale, taken on the line 3—3 of Figure 1.

Figure 4 is an inside elevation of the wind wing forming part of my invention, in a slightly modified form, and Figure 5 is a view similar to Figure 2 of the modification.

Figure 6 is a side elevation of an operating means for my invention, parts being in section.

Figure 7 is a transverse sectional view on the line 7—7 of Figure 6.

An automobile door of any desired or usual construction is illustrated at 9, this having the window opening 90 in its upper portion, as is customary. Within this window opening I position a pane of glass, indicated at 8, this being like the window which forms part of the usual automobile door construction, except that it extends from the rear edge 91 of the door opening 90 forwardly, but not as far as the forward edge 92. It may be guided in the usual manner at 91, and may be likewise guided in a vertical strip 93, which extends between the upper edge and the sill of the window opening 90, and which may be provided with a channel for the reception of the forward edge of the pane 8. The operation of this window may be obtained in any manner desired, and the means for operating it may be any of those means now customarily employed for windows of full width, and to illustrate such a window-operating means I have shown the handle 94.

Forwardly of the pane 8 is the transparent shield or wind wing 1. This is preferably of a height to fit between and close the space between the upper edge of the opening 90 and the sill of the window opening, and of a width to close the space from the forward edge 92 of the window opening to the forward edge of the window pane 8, or at least it extends to the vertical strip 93, which may have a flange or ledge 95 on which the rear edge of the wind wing 1 may seat when the latter is in closed position.

It will be understood that the wind wing 1 is pivotally supported at its forward edge to swing outwardly into the position shown in dotted lines in Figure 2. Various means of accomplishing this may be employed. I have illustrated a vertical post 11, which is supported in bearings 12 at the top and bottom of the forward edge of the window opening 90, and which extends downwardly to a suitable thrust bearing or footing at 13. These bearings, it will be understood, are within the door, and are concealed. Secured upon the post 11 is a channeled frame 10, in which the shield 1 is secured.

As one means of swinging the shield 1 I may provide a rack bar 2, guided at 20 for movement longitudinally of the door, this rack bar meshing with a rack pinion 21, on the shaft 28 of which is carried a handle 22, and to the rack bar is connected a link 23, which in turn connects to the swinging end of a lever arm 24, secured directly upon the upright post 11. Longitudinal movement of the rack bar 2 causes swinging of the lever arm 24, and consequent movement of the shield 1. In order that the shield may be constantly urged towards closed position, I may provide a spiral spring 25, one end being secured, as indicated at 26 (see Figure 3) to the door construction, and its other end being secured to a pin 27 carried by the shaft 28.

Since the wind wing would fly inwardly under the influence of the spring 25, unless restrained, I provide a slotted brace arm 3, pivotally secured to the wind wing or to its frame 10, and a clamping nut 30 secured upon a bolt 31 passing through the slot in the brace 3, by means of which the brace can be clamped and held in any desired position. Release of the clamping nut 30 releases the wind wing to the influence of the spring 25, and it may be so arranged as to be thrown inwardly, but it can be held in any selected position by clamping down on the nut 30 when the wind wing has assumed the desired position. All of this can be done by the driver in an instant, and without detracting from his attention to the operation of the car. It is obvious, of course, that the spring may be eliminated, and the entire control of the wind wing left to some such means as the brace 3 and clamping nut 30.

Since some persons might consider the vertical strip 93 to be to some extent an obstruction to the clear view of the driver, and since it might by some be considered to detract from the appearance of the car, it may be omitted, and the construction will then be as shown in Figures 4 and 5, wherein the rear edge of the wind wing 1 overlaps the forward edge of the pane 8, just outside thereof. It will be noted, too, from this figure, that the post 11 lies just inwardly of the forward edge 92 of the window opening, and that a flange 96 overlaps the post and prevents the entrance of a draft between the post and the edges of the window opening. It will be noted, also, that the frame 10, in the form illustrated, takes the form of a channeled U-shaped member opening rearwardly, the glass wind wing being received and secured in this frame, and the frame being secured to the post 11 by concealed rivets or like securing means, indicated at 19.

What I claim as my invention is:

In combination with a vehicle window frame, a pane of less width than the opening in said frame extending from the rear edge thereof forwardly, a transparent shield extending from the forward edge of the frame rearwardly to close the opening ahead of said pane, an upright post supporting said shield to swing outwardly, a spring operatively connected to said post to urge the shield inwardly, releasable means for holding said shield in any adjusted position, and separate means for moving the shield into any desired position.

Signed at Aberdeen, Washington this 26 day of December, 1929.

CASPER J. W. SODERBERG.